United States Patent
Badkin

(10) Patent No.: US 10,981,494 B2
(45) Date of Patent: *Apr. 20, 2021

(54) WIRELESS CAB MARKER LIGHTS FOR TRUCK

(71) Applicant: Cab Over America LLC, Eugene, OR (US)

(72) Inventor: Vincent L. Badkin, Tucson, AZ (US)

(73) Assignee: CAB OVER AMERICA LLC, Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,141

(22) Filed: Feb. 18, 2020

(65) Prior Publication Data

US 2020/0391654 A1 Dec. 17, 2020

Related U.S. Application Data

(63) Continuation-in-part of application No. 15/686,130, filed on Aug. 24, 2017, now Pat. No. 10,562,441, which is a continuation of application No. 15/645,661, filed on Jul. 10, 2017, now abandoned.

(60) Provisional application No. 62/360,325, filed on Jul. 9, 2016.

(51) Int. Cl.
| | |
|---|---|
| *B60Q 1/26* | (2006.01) |
| *F21V 21/08* | (2006.01) |
| *H05B 47/19* | (2020.01) |
| *F21V 23/04* | (2006.01) |
| *F21S 43/19* | (2018.01) |

(52) U.S. Cl.
CPC ............ *B60Q 1/2611* (2013.01); *F21V 21/08* (2013.01); *F21V 23/045* (2013.01); *F21V 23/0435* (2013.01); *H05B 47/19* (2020.01); *B60Q 2900/10* (2013.01); *B60Q 2900/30* (2013.01); *F21S 43/19* (2018.01)

(58) Field of Classification Search
CPC ............... B60Q 1/2611; B60Q 1/2615; B60Q 2900/10; B60Q 2900/30; F21V 23/0435; F21V 23/045; F21V 21/08; F21V 21/0816; F21V 21/0832; F21V 21/096; F21V 21/0965; F21S 43/19; H05B 47/19
See application file for complete search history.

(56) References Cited

U.S. PATENT DOCUMENTS

| | | |
|---|---|---|
| 7,878,678 B1 | 2/2011 | Stamatatos et al. |
| 9,248,778 B2 | 2/2016 | Ford |
| 9,987,974 B2 | 6/2018 | Salter et al. |
| 10,180,244 B2 | 1/2019 | Stamatatos et al. |
| 10,267,505 B2 | 4/2019 | Van De Sluis et al. |
| 10,562,441 B2 * | 2/2020 | Badkin ................ B60Q 1/2611 |

(Continued)

*Primary Examiner* — Alan B Cariaso
(74) *Attorney, Agent, or Firm* — Brian R. Galvin; Galvin Patent Law LLC

(57) ABSTRACT

A three dimensional truck or SUV cab marker light apparatus comprising a container having a right circular cylinder structure with a shape determined by the number of walls used during assembly, each wall being formed from a generally flat sheet of a rigid material and a transparent material, the walls being assembled to form a container enclosing an interior region for a light-transmission source and having a lower surface for attachment to a cab roof without drilling holes into the cab roof and without installing wires through the cab roof.

2 Claims, 11 Drawing Sheets

(56) References Cited

U.S. PATENT DOCUMENTS

2006/0125618 A1\* 6/2006 Hsu .................... B60Q 1/2615
340/468
2009/0190367 A1 7/2009 Chu
2016/0281942 A1 9/2016 Hernandez, IV
2017/0365136 A1\* 12/2017 Torre Sarmiento ..... F21S 9/022

\* cited by examiner

WIRELESS CAB MARKER LIGHTS FOR TRUCK

CROSS-REFERENCE TO RELATED APPLICATIONS

| Application No. | Date Filed | Title |
|---|---|---|
| Current application | Herewith | WIRELESS CAB MARKER LIGHTS FOR TRUCK Is a continuation-in-part of: |
| 15/686,130 | Aug. 24, 2017 | WIRELESS CAB MARKER LIGHTS FOR TRUCK which is a continuation-in-part of: |
| 15/645,661 | Jul. 10, 2017 | WIRELESS CAB MARKER LIGHTS FOR TRUCK which claims benefit of and priority to: |
| 62/360,325 | Jul. 9, 2016 | WIRELESS CAB MARKER LIGHTS FOR TRUCK |

BACKGROUND OF THE INVENTION

Field of the Art

The disclosure relates to the field of truck and sport utility vehicle (SUV) cab marker lights, and more particularly to a wireless truck and SUV cab marker light and its wireless assembly.

Discussion of the State of the Art

In the field of truck and SUV cab marker lights, the motor vehicle cabs are often equipped with cab marker lights that require drilling holes in the roof (cab) of the motor vehicle. Generally, these cab marker lights are arranged on the roof (cab) above the driver and front passenger seats.

Installation of truck and SUV cab marker lights is generally costly, and involves drilling holes into the roof (cab) of the motor vehicle, a sealant to prevent water leaking in, and wires that need to be installed underneath the head liner. This method is costly to install and can take several hours to install properly. If sealant and wires are incorrectly installed, roof (cab) and interior of the vehicle may be subjected to future water leakage during rain, electrical corrosion, headliner damage, stains, molds, and mildews.

What is needed, is a means to provide truck and SUV cab marker lights without drilling holes into the roof (cab) of the motor vehicle, thereby eliminating the need for a water sealant, and that eliminates the need for installing wires underneath the head liner, that also provides an efficient method of cab marker light use without the need for wires, while being installed in an efficient manner that is cost effective and does not take large amounts of time to install or cause unnecessary damage.

SUMMARY OF THE INVENTION

Accordingly, the inventor has conceived and reduced to practice, in a preferred embodiment of the invention, an apparatus for wireless cab marker lights, that may be installed without drilling holes into the truck and SUV cabs, and that uses a wireless remote control to activate cab marker lights.

In a preferred embodiment of the invention, a right circular cylinder being formed of a solid material or of a malleable material configured to enclose a light emitting transmission source, with the front being made from a transparent material to allow transmission from a source.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Detailed Description of Exemplary Embodiments

Figure 1:
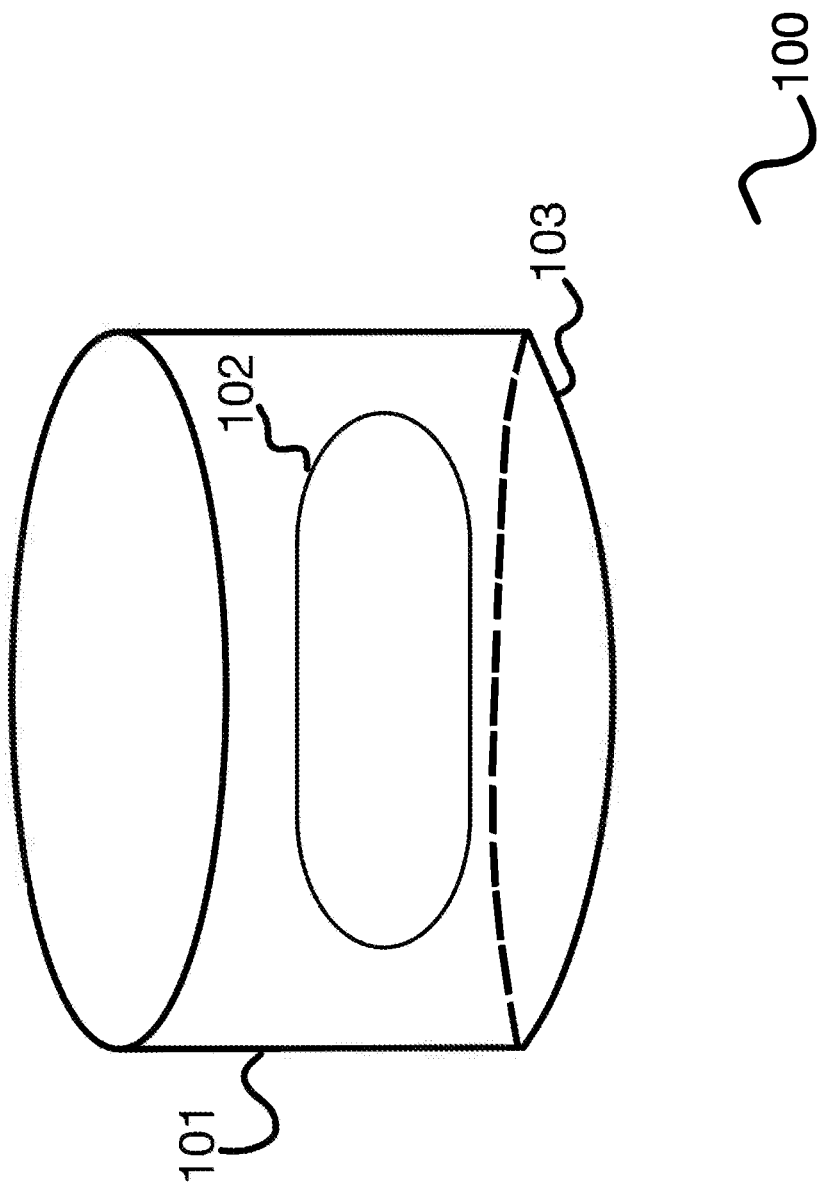
FIG. 1 is an illustration of an exemplary cab marker light model according to a preferred embodiment of the invention.

FIG. 1 is an illustration of an exemplary cab marker light model 100 according to a preferred embodiment of the invention.

According to the embodiment, a cab marker light 100 may comprise a generally right circular cylinder having opaque or transparent walls 101 (generally three walls of a right circular cylinder to be assembled into a hockey puck-type shaped cab marker light as illustrated; however, it should be appreciated that other final shapes and numbers of walls may be used according to a desired arrangement or use case, such as using a bisected dome-type shape or a single-wall arrangement to form a dome cab marker light model, or other arrangement) formed of a solid material such as metal or of a malleable material such as a synthetic polymer (plastic), and configured to enclose a light emitting transmission source 102 within the walls when assembled and having a bottom face 103 for affixing to truck or SUV cab roof. Each wall 101 may be formed from or machined into a single sheet of material, such as by cutting or molding material for simple and cost-effective production as well as efficient packaging for transport. It should be appreciated that more complex or alternate construction may be utilized, such as assembly from multiple precut sheets of material (for example, via welding).

Figure 2:
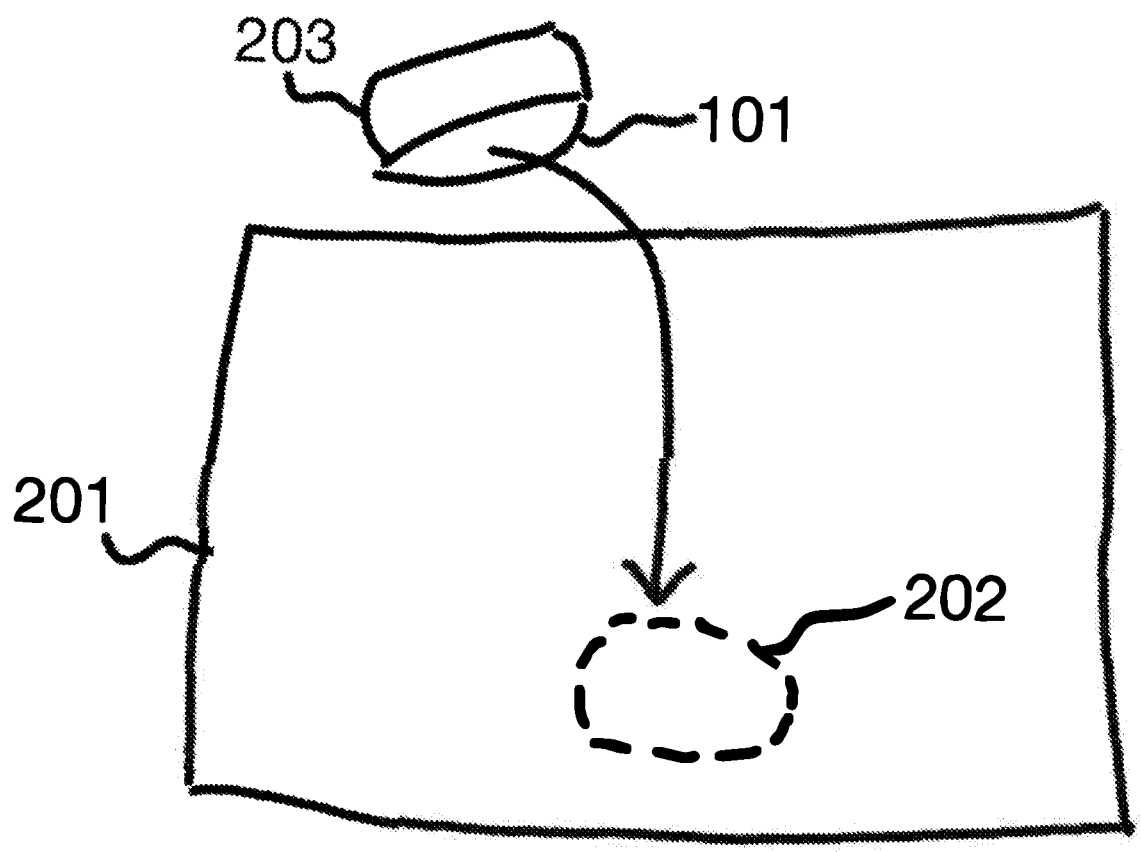
FIG. 2 is an illustration of an exemplary installation of a cab marker light without drilling holes according to a preferred embodiment of the invention.

FIG. 2 is an illustration of an exemplary installation 200 of a cab marker light without drilling holes according to a preferred embodiment of the invention. According to the embodiment, cab marker light 203 may be installed 202 to outer surface of cab roof 201 by affixing base 101 of cab marker light 203 to cab roof 201 directly without drilling holes into cab roof 201. Affixation of cab marker light 203 to cab roof 201 may be achieved by applying a pressure-sensitive adhesive (PSA) to either base 101 of cab marker light 203 or to surface of cab roof 201 (generally PSA is a removable heavy-duty two-sided tape; however, it should be appreciated that other adhesives may be used according to a desired arrangement or use case, such as using a permanent super high tack glue spot or other removable or permanent adhesives). While adhesives are a convenient means of attachment in many cases, any means of attachment that does not alter or damage the surface to which the lights are attached may be used. In some embodiments, magnets, hook and loop (e.g., Velcro®), suction cups, or straps may be used. For example, in cases where the roof or substructure have steel or other ferrous metal components, the base of the cab marker lights may be fitted with magnets that magnetically attach to the surface of the cab roof. Alternatively, magnets may be attached to the cab roof using an adhesive, and the cab marker lights may have a steel or other ferrous metal base, which magnetically attach to the magnets. In another embodiment, hook and loop fastener (e.g., Velcro®) may affixed to both the surface of the cab roof and the base of the cab marker lights using adhesive such that the cab marker lights may be attached to the roof using the hook and loop (e.g., Velcro®) fastener. in another embodiment, suction cups may be mounted to the base of the marker lights and used to affix the marker lights to the cab roof using suction. The suction cups may be activated by pressure fit, a mechanical lever, a vacuum pump, or other means of creating a suction. In some embodiments, especially where the cab marker lights are to be used temporarily, the cab marker lights may be affixed to a strap, and the strap may be attached to the vehicle (e.g., by hooks that fit into the door frame or rain gutters). Other variations are possible, and any means of attaching the lights to the surface without damaging the surface may be employed.

Figure 3:
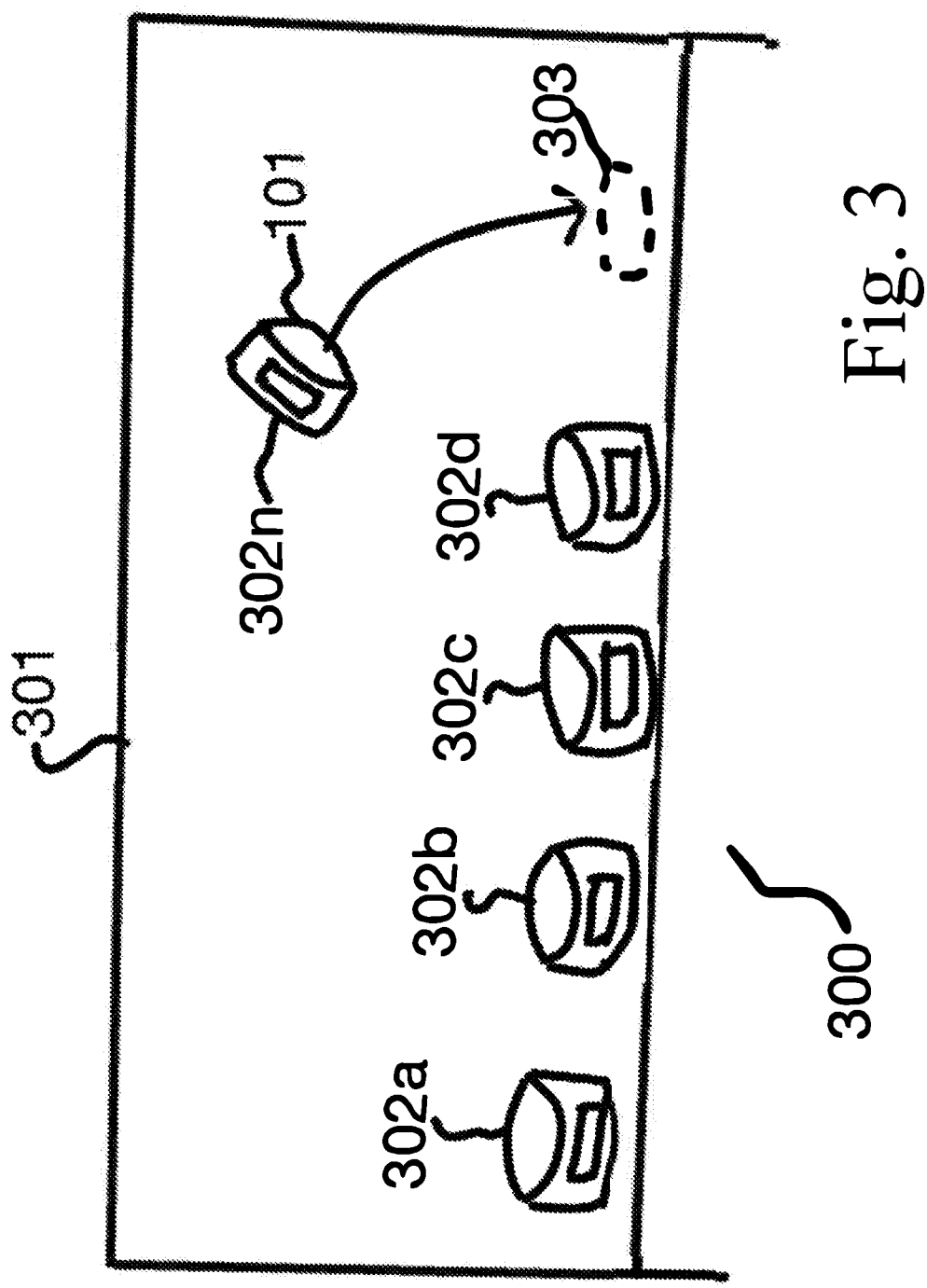
FIG. 3 is an illustration of an exemplary arrangement of cab marker lights according to a preferred embodiment of the invention, illustrating the arrangement of multiple cab marker lights on the cab of a truck or SUV.

FIG. 3 is an illustration of an exemplary arrangement 300 of a truck or SUV cab marker light according to a preferred embodiment of the invention, illustrating the arrangement of multiple cab marker lights 302a, 302b, 302c, 302d, and 302n on a truck or SUV cab 301. According to the embodiment, any number of cab marker lights 302a-n may be arranged on cab roof 301. Cab marker lights 302a-n may be secured to outer roof 303 of cab 301 by securing light base 101 to cab roof 301, 303. Lights 302a-n may be secured to cab roof 301, 303 with an adhesive, or other non-altering or non-damaging means, as opposed to drilling multiple holes into both outer cab roof and interior cab roof. According to the embodiment illustration, cab marker lights 302a-n may be secured in a linear arrangement 300 however, it should be appreciated that other arrangements may be used according to a desired use case such as a staggered linear arrangement (where lights are alternately placed at higher points along a linear path giving a mountain range look from an aerial view point) or other arrangements. If initial arrangement is undesired upon installation, cab marker lights 302a-n may be removed and repositioned into desired arrangement.

Figure 4:
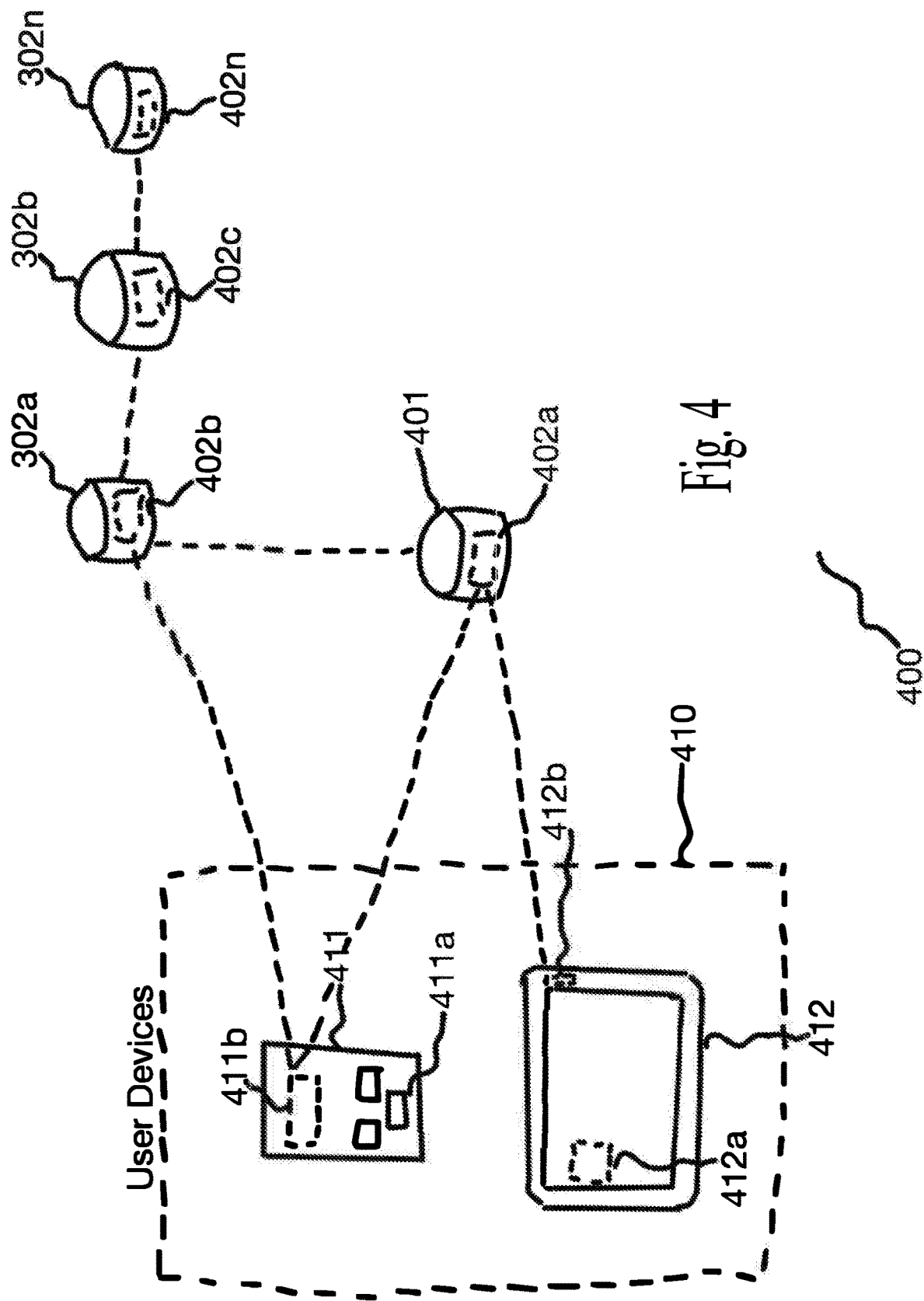
FIG. 4 is an illustration of an exemplary wireless control of cab marker lights according to a preferred embodiment of the invention.

FIG. 4 is an illustration of an exemplary wireless control 400 of cab marker lights according to a preferred embodiment of the invention, illustrating the arrangement of wireless devices 410 that use Bluetooth to control cab marker lights on a truck or SUV cab. According to the embodiment, a wireless device 410 such as a mobile device 412 or a remote control 411 may be used to control cab marker lights 302a, 302b, 302n, and 401. Wireless control 400 commands 411b, 412b may be issued to a master cab light 401 which in turn sends commands to corresponding slave lights 302a-n or commands may be sent directly to cab lights 302a-n simultaneously without the use of master cab light 401. A mobile device 412 such as a smart phone or a tablet with a mobile app 412a that uses a Bluetooth interface may send commands 412b from app 412a to Bluetooth receivers 402a, 402b, 402c, and 402n within cab lights 302a-n or master cab light 401. A remote control 411 may send commands 411b to master cab light 401 or cab lights 302a-n using Bluetooth receivers 402a-n via commands from remote control 411 buttons 411a, which may have specific commands designated to specific buttons 411a. Wireless control mobile apps and buttons on remote controls generally comprise commands "off" and "on" for cab marker lights; however, it should be appreciated that other commands may also be used such as, flashing lights for emergencies, or commands to alter the brightness of cab marker lights, or commands for color displays for decorative purposes such as Christmas, or other commands.

Figure 5:
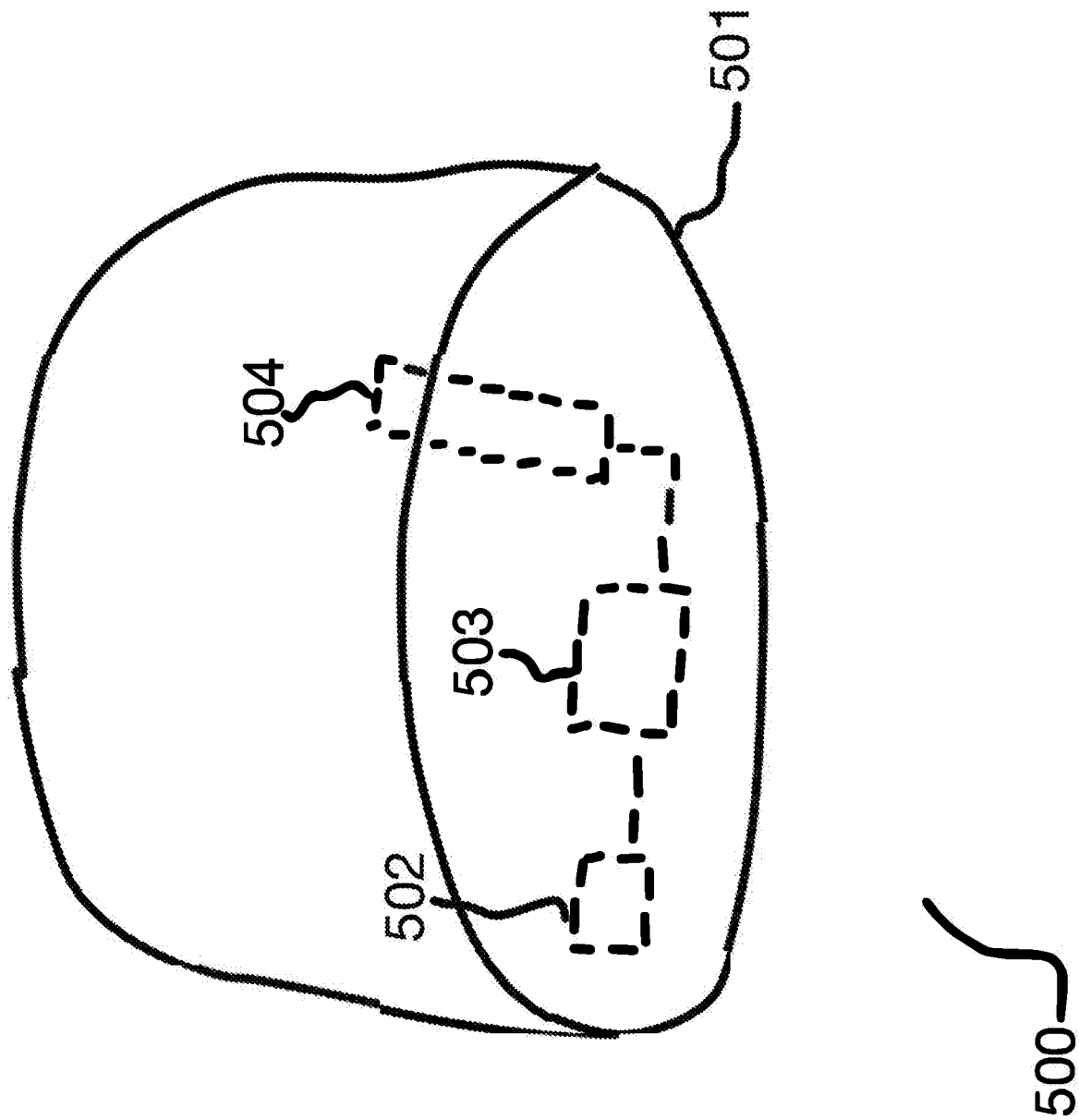
FIG. 5 is an illustration of an exemplary electronics package according to a preferred embodiment of the invention; illustrating a rechargeable power source, a remote receiver switch, and a light transmission source.

FIG. 5 is an illustration of an exemplary electronics package 500 according to a preferred embodiment of the invention; illustrating a rechargeable power source 502, a remote receiver switch 503, and a light transmission source 504. According to the embodiment, an electronics package 500 is housed within walls 101 of cab marker light 501. Cab marker light 501 electronics package 500 contains a rechargeable power source 502 such as but not limited to a battery pack (such as but not limited to; a lithium-ion [LIB] battery, a nickel-metal hydride [NIMH] battery, or other rechargeable battery) and/or a photovoltaic cell 602, and a remote receiver switch 503 such as a Bluetooth receiver to receive commands from a mobile app 412a on a mobile device 412 or a remote control 411. Cab marker light 501 electronics package 500 also contains a light transmission source 504 such as but not limited to light emitting diode (LED) bulbs.

Figure 6:
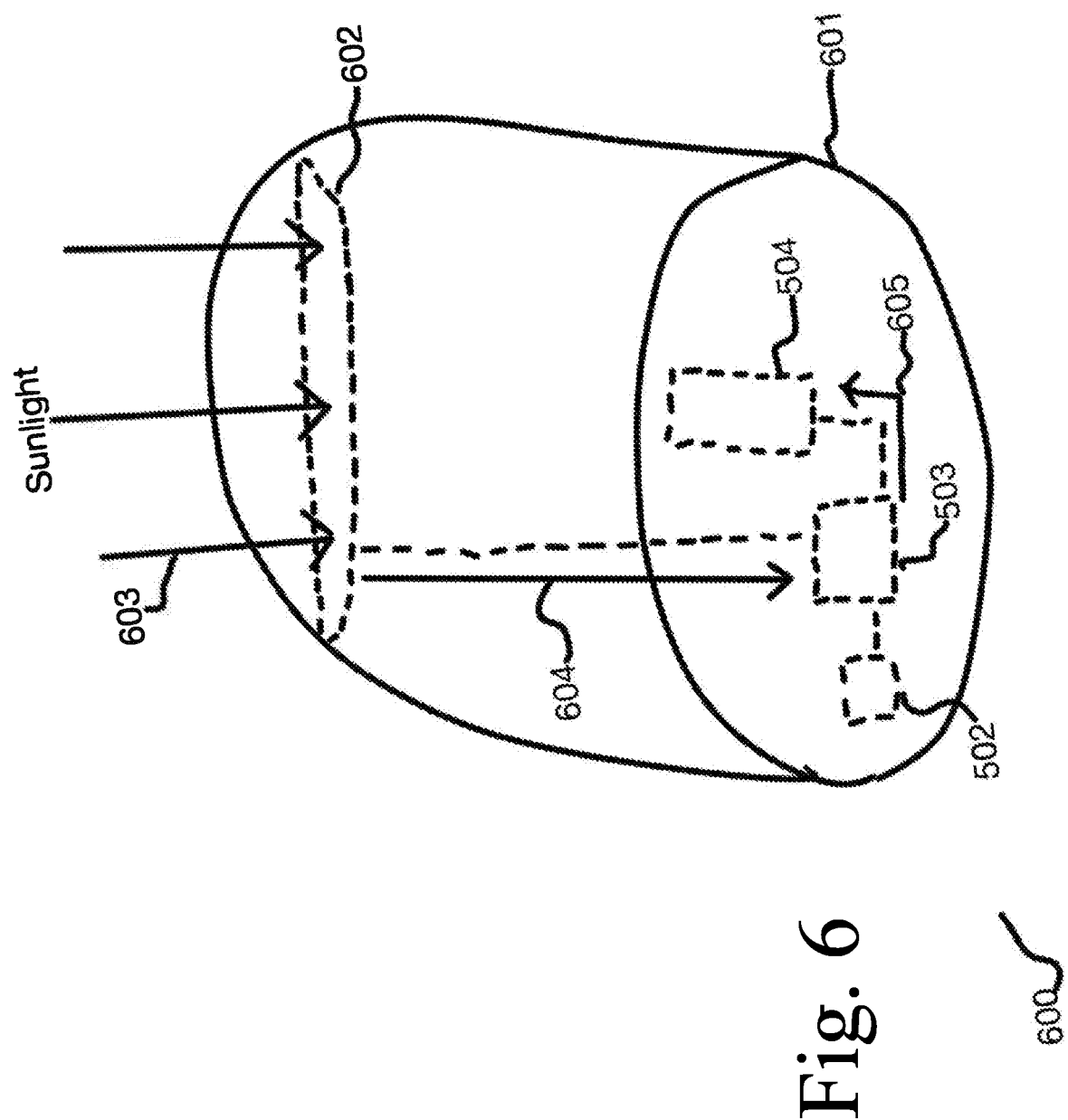
FIG. 6 is an illustration of an exemplary cab marker light with a photovoltaic cell according to a preferred embodiment of the invention, illustrating the use of a rechargeable power source within a cab marker light.

FIG. 6 is an illustration of an exemplary electronics package using a photovoltaic cell 600 according to a preferred embodiment of the invention; illustrating the use of a rechargeable power source 502 within cab marker light 601. According to the embodiment, a photovoltaic cell 602 is housed within walls 101 of cab marker light 601 with a rechargeable power source 502. Photovoltaic cell 602 is placed near top of cab marker light 601 housing (walls), facing upwards and/or outwards towards a natural light transmission source 603 such as the sun. During daylight hours, when natural light transmission source is available, photovoltaic cell 602 will absorb natural light source's transmission 603 charging 604 cab marker light's power source 502. During night hours, when natural light transmission source 603 is unavailable, cab marker light's power source 502 will then power 605 electronics package 500, which powers light transmission source 504 while photovoltaic cell 602 rests (it should be appreciated that other types of rechargeable power sources may be used according to a desired use case, such as a battery pack with a rechargeable and/or replaceable batteries or other power sources).

Figure 7:
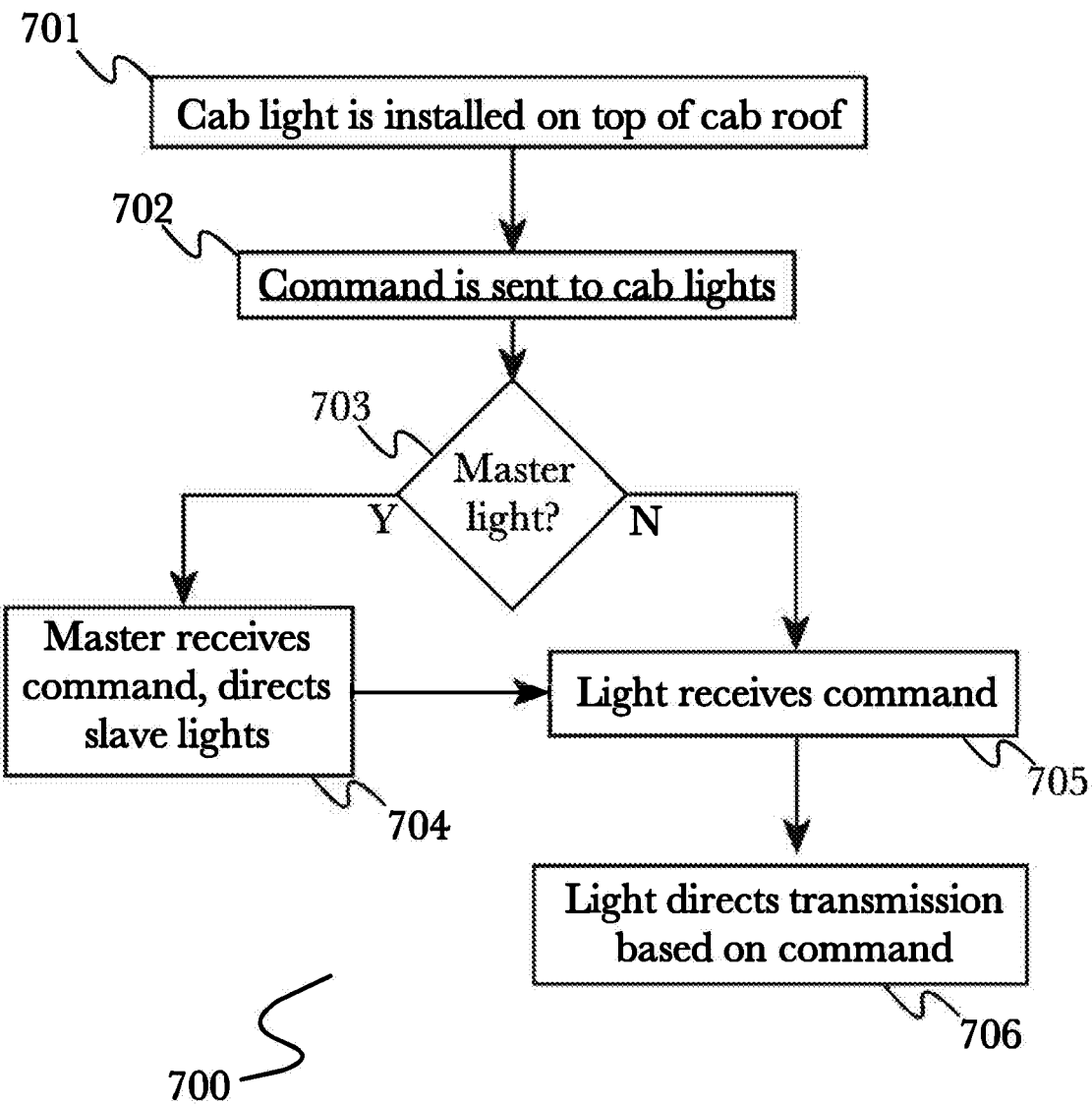
FIG. 7 is an illustration of an exemplary method diagram according to a preferred embodiment of the invention, illustrating the installation and use of a wireless cab marker light.

FIG. 7 is an illustration of an exemplary method diagram 700 according to a preferred embodiment of the invention, illustrating the installation 701 and use 702-706 of a wireless cab marker light. Cab marker light is installed to roof of cab 701 without drilling holes. Command is sent from mobile app on mobile device or tablet to cab marker lights 702. If there is a master cab light 703, master light receives command 704 and directs it to remaining slave lights 705; if there is no master cab light 703, app sends command 702 directly to cab lights 705. Cab lights direct light transmission based on commands 706.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
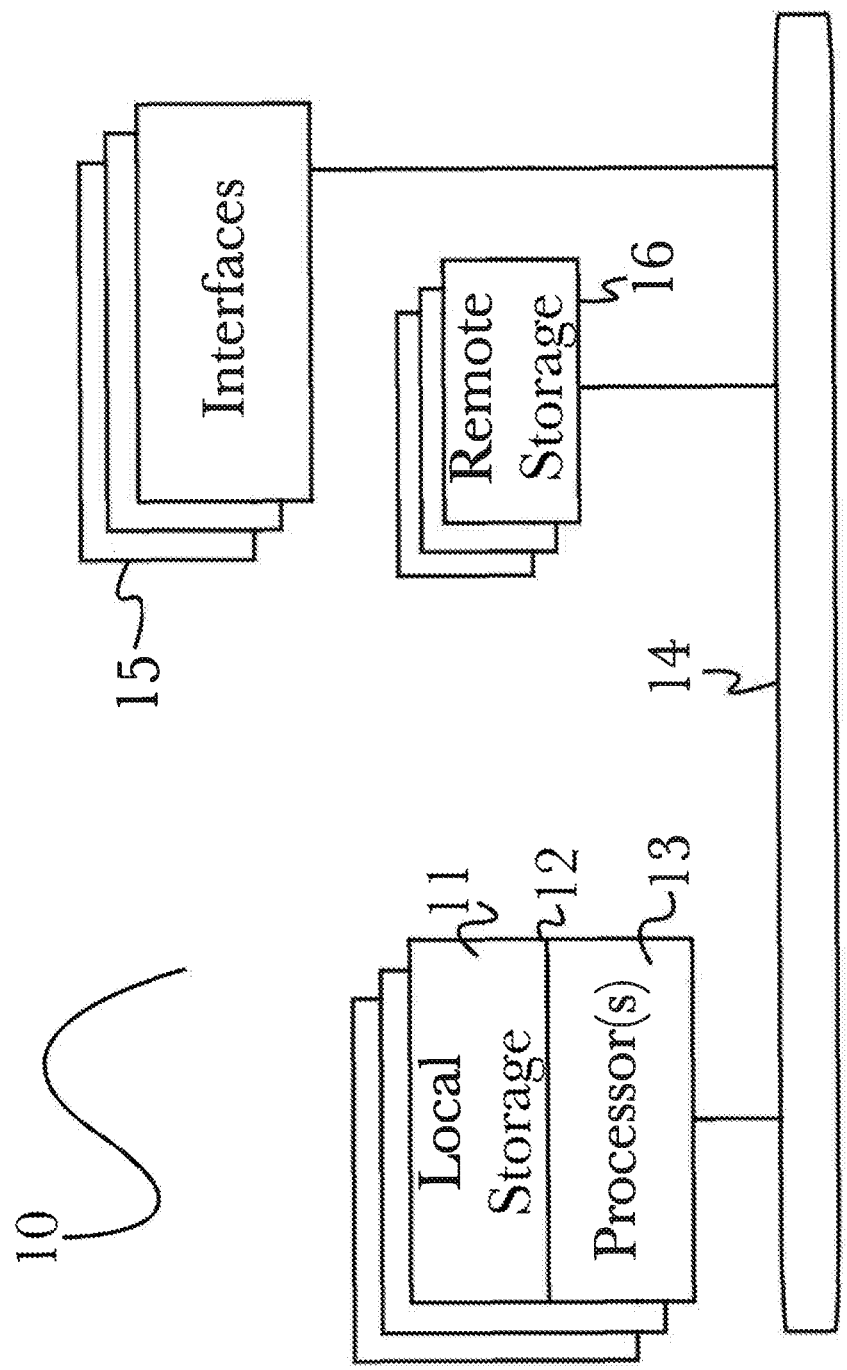
FIG. 8 is a block diagram illustrating an exemplary system architecture of a computing device used in an embodiment of the invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
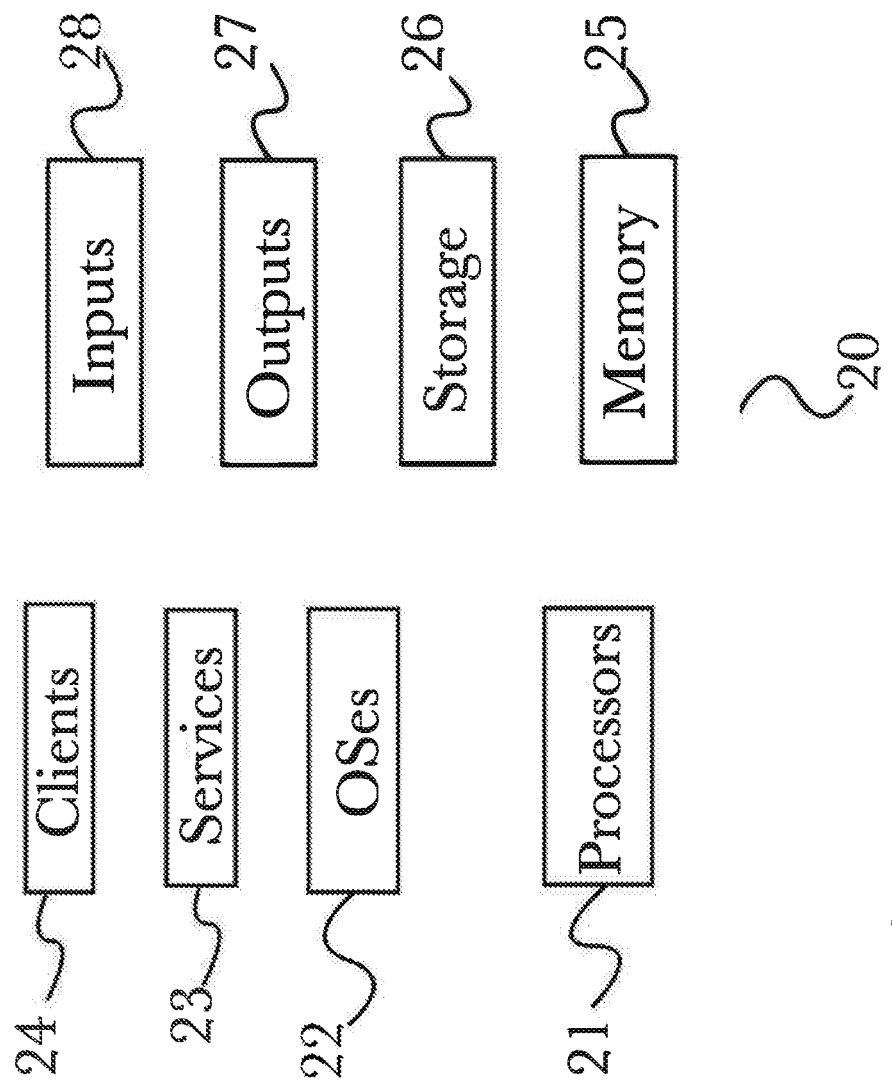
FIG. 9 is a block diagram illustrating an exemplary logical architecture for a client device, according to an embodiment of the invention.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
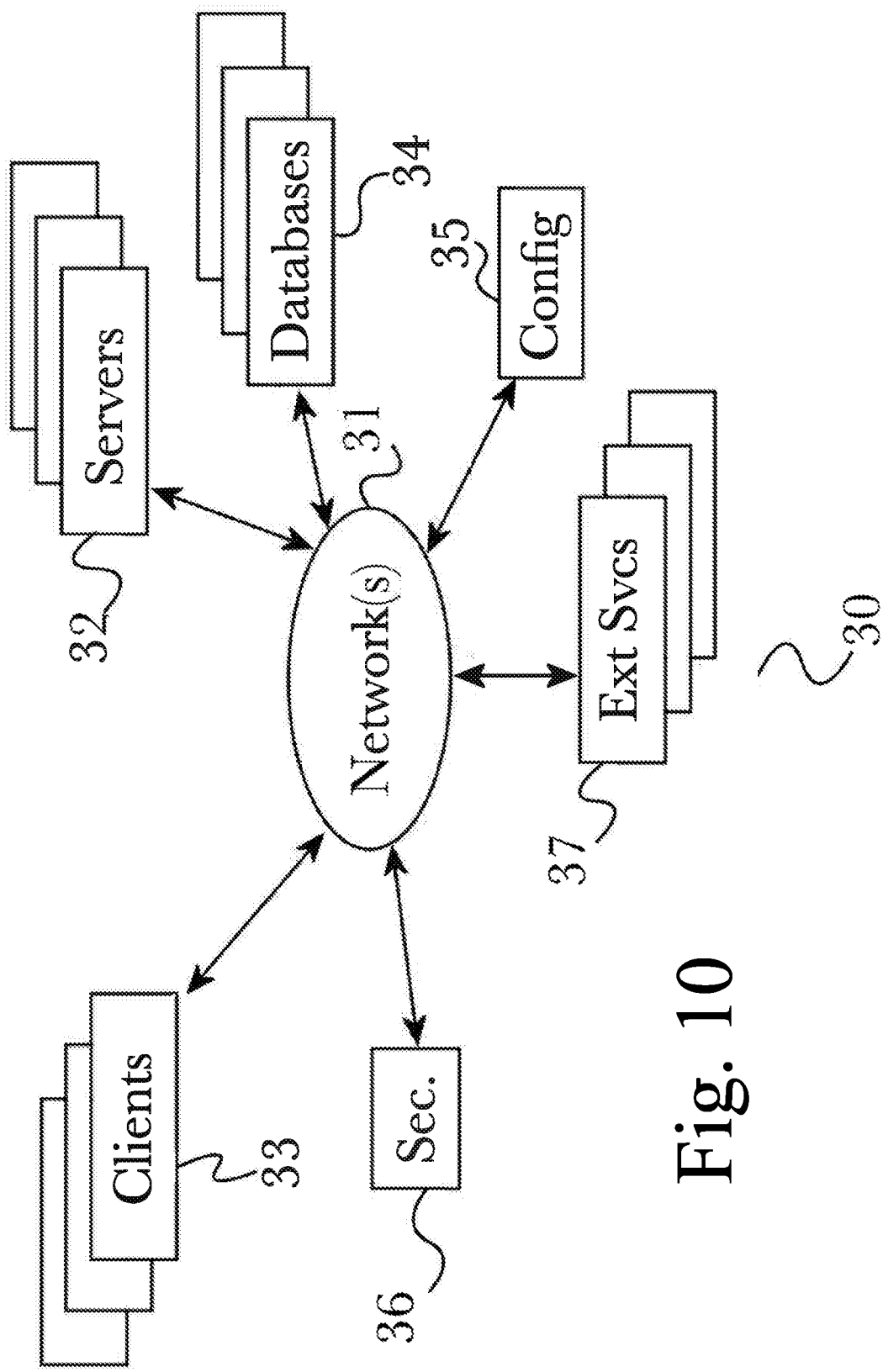
FIG. 10 is a block diagram showing an exemplary architectural arrangement of clients, servers, and external services, according to an embodiment of the invention.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
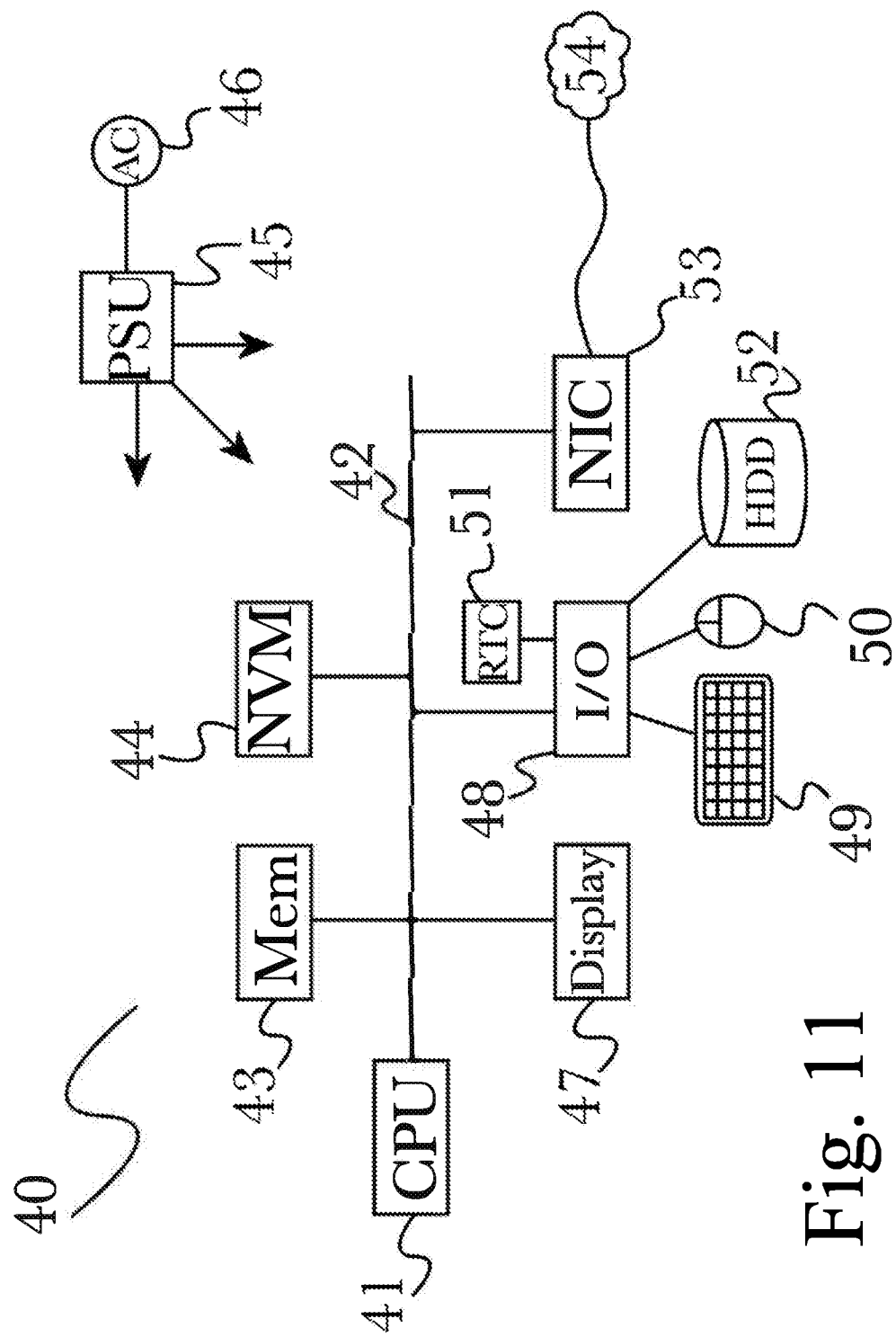
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

What is claimed is:

1. An apparatus for wireless vehicle marker lights, comprising:
   one or more vehicle marker lights, each comprising:
      a container enclosing an inner region, a portion of the container being made of a transparent material to allow for transmission of light through the transparent material;
      a light-transmitting source inside the container, the light-transmitting source being configured to project light through the transparent material;
      a lower base surface on the container configured to attach to a surface using a means that does not physically alter the surface; and
      a vehicle marker light electronics package inside the container, the vehicle marker light electronics package configured to:
         receive one or more commands from a wireless remote control; and
         operate the light-transmitting source in accordance with the one or more commands; and
   a wireless remote control comprising:
      one or more buttons; and
      a wireless remote control electronics package configured to:
         detect the operation of one of the one or more buttons; and
         transmit a command to the one or more vehicle marker lights; and
   wherein the one or more vehicle marker lights may be attached to the roof of a vehicle, and may be operated from inside the vehicle using the remote control.

2. An apparatus for wireless vehicle marker lights, comprising:
- one or more vehicle marker slave lights, each comprising:
  - a slave container enclosing an inner region, a portion of the slave container being made of a transparent material to allow for transmission of light through the transparent material;
  - a slave light-transmitting source inside the container, the slave light-transmitting source being configured to project light through the transparent material;
  - a slave lower base surface on the container configured to attach to a surface using a means that does not physically alter the surface; and
  - a slave electronics package inside the slave container, the slave electronics package configured to:
    - receive one or more commands from a vehicle marker master light; and
    - operate the slave light-transmitting source in accordance with the one or more commands; and
- a vehicle marker master light, comprising:
  - a master container enclosing an inner region, a portion of the master container being made of a transparent material to allow for transmission of light through the transparent material;
  - a master light-transmitting source inside the master container, the master light-transmitting source being configured to project light through the transparent material;
  - a slave lower base surface on the container configured to attach to a surface using a means that does not physically alter the surface; and
  - a master electronics package inside the master container, the master electronics package configured to:
    - receive one or more commands from a wireless remote control;
    - operate the master light-transmitting source in accordance with the one or more commands; and
    - send the one or more commands to the one or more vehicle marker slave lights; and
- a wireless remote control comprising:
  - one or more buttons; and
  - a wireless remote control electronics package configured to:
    - detect the operation of one of the one or more buttons; and
    - transmit one or more commands to the vehicle marker master light; and
- wherein the one or more vehicle marker slave lights and the vehicle marker master light may be attached to the roof of a vehicle, and may be operated from inside the vehicle using the wireless remote control.

\* \* \* \* \*